(12) United States Patent
Dooley et al.

(10) Patent No.: US 11,128,459 B2
(45) Date of Patent: Sep. 21, 2021

(54) MITIGATING SERVICE DISRUPTIONS IN KEY MAINTENANCE

(71) Applicant: ITS, INC., Johnston, IA (US)

(72) Inventors: Terry Dooley, West Des Moines, IA (US); Thomas Sherrard, Des Moines, IA (US); Shane Van Waardhuizen, Pella, IA (US); Manish Nathwani, Grimes, IA (US); Craig F. Branch, Grimes, IA (US)

(73) Assignee: ITS, INC., Johnston, IA (US)

( * ) Notice: Subject to any disclaimer, the term of this patent is extended or adjusted under 35 U.S.C. 154(b) by 359 days.

(21) Appl. No.: 16/203,290

(22) Filed: Nov. 28, 2018

(65) Prior Publication Data

US 2020/0169401 A1     May 28, 2020

(51) Int. Cl.
*H04L 9/00* (2006.01)
*H04L 9/16* (2006.01)
(Continued)

(52) U.S. Cl.
CPC .......... *H04L 9/0891* (2013.01); *G06F 21/606* (2013.01); *H04L 9/0822* (2013.01); *H04L 9/0861* (2013.01); *H04L 9/16* (2013.01); *H04L 63/0428* (2013.01); *H04L 2209/12* (2013.01); *H04L 2463/061* (2013.01); *H04L 2463/062* (2013.01)

(58) Field of Classification Search
CPC ... H04L 9/0891; H04L 9/0822; H04L 9/0861; H04L 9/16; H04L 63/0428; H04L 2209/12; H04L 2463/061; H04L 2463/062; G06F 21/606
See application file for complete search history.

(56) References Cited

U.S. PATENT DOCUMENTS 8,984,274 B1 * 3/2015 Kerzner ................. H04L 9/0891
713/150
9,053,480 B1 * 6/2015 Jenks ................. G06Q 20/3674
(Continued)

*Primary Examiner* — Darshan I Dhruv
(74) *Attorney, Agent, or Firm* — Shook, Hardy & Bacon LLP

(57) ABSTRACT

Embodiments of the present invention provide systems and techniques for changing cryptographic keys in high-frequency transaction environments to mitigate service disruptions or loss of transactions associated with key maintenance. In various embodiments, a server device can employ a working key encrypted with a first master key to decrypt messages being communicated from a client device, whereby each message is encrypted with a first cryptogram that was generated based on the working key encrypted with the first master key. While the working key encrypted with the first master key is being employed, the server device can generate a notification including a second cryptogram generated based on the working key encrypted with a second master key for transmission to the client device. The transmitted notification can cause the client device to encrypt the messages being communicated with the second cryptogram. The server device can concurrently employ the working key encrypted with one of the first and second master keys to decrypt messages received from the client device, whether encrypted with the first cryptogram or the second cryptogram.

18 Claims, 6 Drawing Sheets

(51) Int. Cl.
*G06F 21/60* (2013.01)
*H04L 29/06* (2006.01)
*H04L 9/08* (2006.01)

(56) References Cited

U.S. PATENT DOCUMENTS

| | | | |
|---|---|---|---|
| 9,172,532 B1* | 10/2015 | Fuller | H04L 9/0894 |
| 9,608,813 B1* | 3/2017 | Roth | H04L 9/3234 |
| 9,722,974 B1* | 8/2017 | Fuller | H04L 63/061 |
| 10,116,440 B1* | 10/2018 | Rudzitis | H04L 9/0825 |
| 10,313,123 B1* | 6/2019 | Grubin | H04L 9/3236 |
| 10,331,895 B1* | 6/2019 | Roth | G06F 21/602 |
| 2002/0073309 A1* | 6/2002 | Kurn | H04L 9/14 |
| | | | 713/155 |
| 2006/0179309 A1* | 8/2006 | Cross | G06F 21/6281 |
| | | | 713/168 |
| 2007/0140496 A1* | 6/2007 | Phinney | H04L 9/0894 |
| | | | 380/286 |
| 2011/0124319 A1* | 5/2011 | Fu | H04L 67/02 |
| | | | 455/414.1 |
| 2012/0331293 A1* | 12/2012 | Ma | H04N 21/2387 |
| | | | 713/168 |
| 2013/0219164 A1* | 8/2013 | Hamid | H04L 9/08 |
| | | | 713/150 |
| 2014/0050317 A1* | 2/2014 | Sabin | H04L 9/0894 |
| | | | 380/44 |
| 2014/0156534 A1* | 6/2014 | Quigley | G06Q 20/3829 |
| | | | 705/71 |
| 2016/0374127 A1* | 12/2016 | Sugaya | G06F 16/95 |
| 2017/0134348 A1* | 5/2017 | Roth | H04L 63/08 |
| 2017/0222802 A1* | 8/2017 | Rubin | H04L 9/14 |
| 2017/0244687 A1* | 8/2017 | Moulds | G06F 7/00 |
| 2017/0257214 A1* | 9/2017 | Stufflebeam | H04L 9/088 |
| 2017/0324560 A1* | 11/2017 | Pesonen | H04L 9/3228 |
| 2018/0034643 A1* | 2/2018 | Yang | H04L 9/3263 |
| 2018/0054303 A1* | 2/2018 | O'Toole | G06F 21/6263 |
| 2018/0152448 A1* | 5/2018 | Fitzgerald | H04L 63/0272 |
| 2018/0219671 A1* | 8/2018 | Velissarios | H04L 63/08 |
| 2019/0089531 A1* | 3/2019 | Le Saint | H04L 9/14 |
| 2019/0149527 A1* | 5/2019 | John | H04L 9/088 |
| | | | 713/171 |
| 2019/0207915 A1* | 7/2019 | Schaap | H04L 63/0442 |
| 2019/0245687 A1* | 8/2019 | Ja | H04L 63/065 |
| 2019/0295063 A1* | 9/2019 | Wong | G06Q 20/3829 |
| 2020/0099511 A1* | 3/2020 | Jarry-Lacombe | G06F 21/64 |
| 2020/0213283 A1* | 7/2020 | Roth | H04L 9/0825 |

\* cited by examiner

MITIGATING SERVICE DISRUPTIONS IN KEY MAINTENANCE

BACKGROUND

In high-frequency client-server transaction environments, downtime associated with system maintenance can be costly. For instance, electronic transactions relating to payment processing application services can exceed rates of over several thousands of transactions per second. Features oftentimes most relevant to customers of high-frequency transaction application service providers relate to both security and reliability (i.e., uptime). Mitigating downtime when security and reliability are both essential to customers can be problematic, however. Best practices for maintaining secured environments requires that cryptographic keys be periodically updated, which typically results in system downtime. Moreover, as technical difficulties arise during the key updating process, transactions can become corrupted and/or lost entirely, which is unacceptable for certain applications, particularly for those relating to payment processing application services.

SUMMARY

Embodiments of the present invention relate to the mitigation of downtime associated with cryptographic key maintenance. More particularly, embodiments relate to a system and various techniques for mitigating service disruption and transaction loss during a change of cryptographic keys, particularly in high-frequency client-server transaction environments.

In an embodiment, a server device employs hardware security modules to decrypt messages being communicated from a client device directed to the server device. The messages being communicated are encrypted under a working key encrypted under a first "master key" of the hardware security modules. While the messages are being communicated, the server device generates a notification that includes a second working cryptogram that was generated based on the working key encrypted with a second master key that replaced the first master key on a subset of the hardware security modules. The generated notification is transmitted from the server device to the client device, which causes the client device to begin encrypting the messages with the second working cryptogram included in the transmitted notification.

As is common in high-frequency transaction environments, the change in encryption keys can result in messages being received by the server device within a similar timeframe (e.g., 100 ms). The server device can employ the subset of the hardware security modules to decrypt any communicated messages that are encrypted with the second working cryptogram, while concurrently employing a remaining subset of the hardware security modules to decrypt any communicated message that were encrypted with the first working cryptogram. In this way, a change of a first master key to a second master key on the server device, in addition to a change of a first working cryptogram to a second working cryptogram on the client device, can be performed without impacting an uptime of the server device or an adoption of a new working cryptogram by the client device. In other words, the described system and techniques can mitigate service interruption or transaction loss during changes of cryptographic keys in high-frequency transaction environments.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
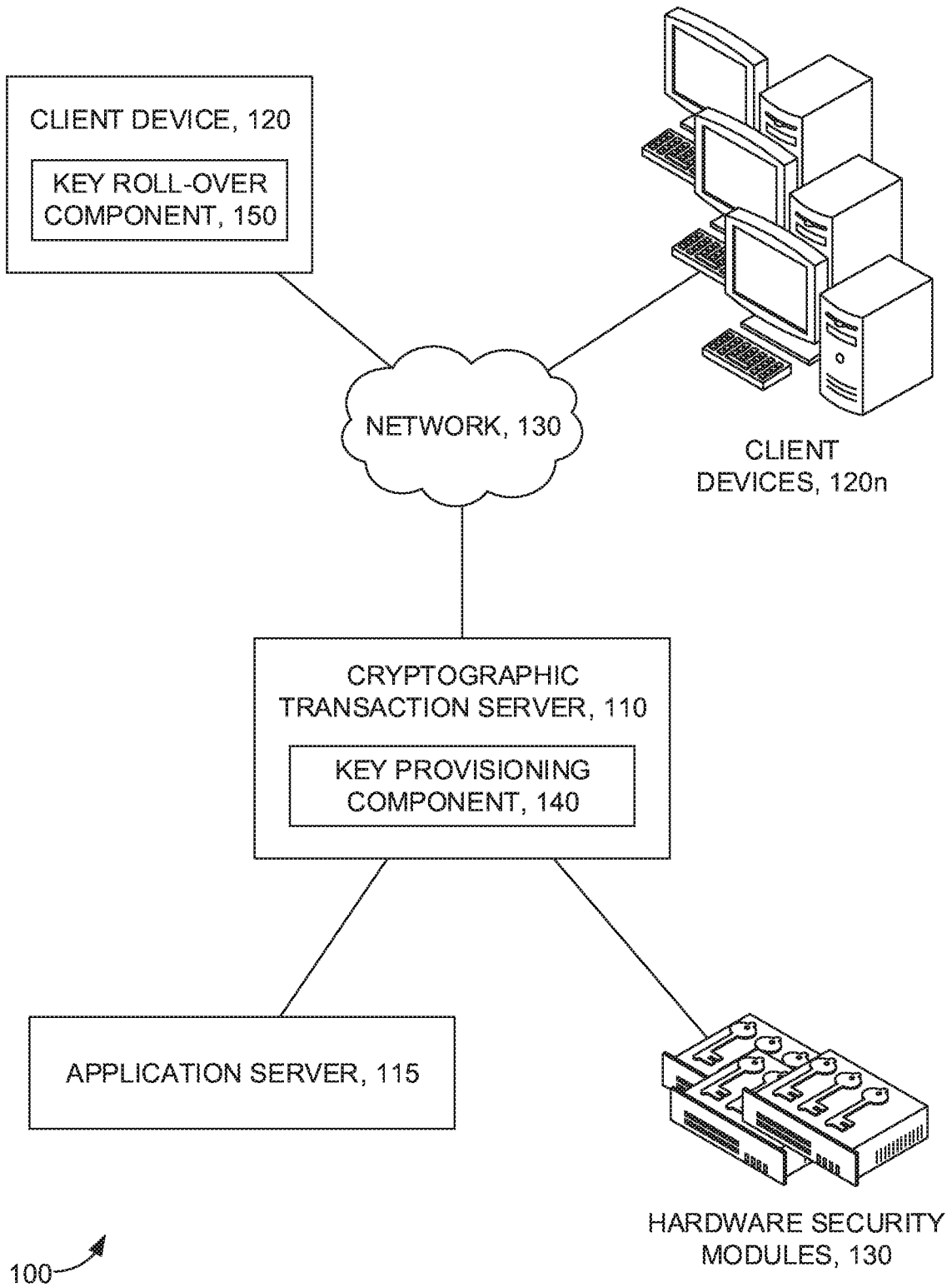
FIG. 1 is an exemplary system diagram in accordance with some embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

High-frequency network-based transaction processing environments requires that servers of such environments, responsible for receiving and processing such transactions, are secure, reliable and robust. Said in another way, if a server responsible for receiving and processing high-frequency transactions from one or more clients goes down, transactions communicated from the clients can be entirely lost or corrupted, which can be unacceptable in certain applications, such as payment processing by way of example. In order to maintain a high level of security, servers and clients can utilize cryptographic keys to secure (e.g., encrypt, decrypt) transactions or components thereof (either herein also referred to as "messages") communicated there between. Best practice security measures also generally requires that the clients and servers change their cryptographic keys on a periodic basis. In conventional transaction processing environments, however, a change of cryptographic keys may result in messages that cease to be transmitted and/or received while new keys are provisioned for securing the messages. As noted above, certain applications, particularly those relating to high-frequency transaction processing, cannot afford to experience disruptions in service. A disruption in service, or in other words server downtime, can result in lost or corrupted transactions communicated from various clients.

Embodiments described herein can mitigate service disruptions resulting in transaction loss or corruption associated with cryptographic key changes in high-frequency transaction processing environments. On a high level, various embodiments can mitigate cryptographic key change-related service disruptions by passively installing and activating a new master key on a server device, while a prior master key is currently installed and activated for decrypting messages being communicated from a plurality of client devices. Each message being communicated from the client devices is encrypted with a prior working cryptogram that was generated based on a working key being encrypted with the prior master key. The server device can notify one or more of the client devices by sending each a notification that is generated to include a new working cryptogram generated based on the working key being encrypted with the new master key. In various embodiments, based on a client receiving the notification, the notification can cause the client device to seamlessly employ the new working cryptogram included in the notification for encrypting the message communicated, moving forward, to the server device. In essence, a "rollover" from the prior working cryptogram to the new working cryptogram, utilized by a client device for encrypting message for communication to the server device is performed based on the server-generated notification being received by the client device. The server device can employ the working key encrypted with the new master key to decrypt communicated message that are encrypted with the new working cryptogram while concurrently employing the working key encrypted with the prior master key to decrypt any communicated messages that were encrypted with the prior working cryptogram. In various embodiments, the server device can communicate the generated notification to any selected portion of the client devices, piecemeal or periodically, to facilitate a graceful transition of all client devices from the prior working cryptogram to the new working cryptogram.

Turning now to FIG. 1, a schematic depiction is provided illustrating an exemplary system 100 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system in FIG. 1 depicts an exemplary cryptographic transaction server 110 for managing cryptographic operations in a high frequency transaction processing environment. In various embodiments, the cryptographic transaction server 110 can manage cryptographic keys, generate new keys, provision new keys, and select and/or load balance hardware security modules to perform cryptographic functions, among other things, by way of non-limiting example. In various embodiments, the cryptographic transaction server 110 manages cryptographic operations for securing an application service (e.g., a transaction processing service), which can be hosted by an application server 115 in communication with the cryptographic transaction server 110. Among other things, the application server 115 can send and/or receive communications via the cryptographic transaction server 110 so that communications to and from the application server 115 remain secured (i.e., encrypted).

In various embodiments, any client device 120 of client devices 120n can employ the application service hosted by the application server 115 by sending and/or receiving messages to the application server 115 via the cryptographic transaction server 110. The application service of application server 115 can be associated with a URI (e.g., a domain name or other reference identifier) that directs communications intended for the application service to the cryptographic transaction server 110 via a network 130, such as the Internet. In this way, the cryptographic transaction server 110 can encrypt and/or decrypt messages being communicated to and/or from the application service of application server 115.

The cryptographic transaction server 110 can receive, from client device 120 via the network 130, message that are encrypted by the client device 120. In various embodiments, a message can be encrypted "under a working key" whose cryptogram is provided to the client device 120 by the cryptographic transaction server 110. In other words, the client device 120 can employ the provided cryptogram to encrypt messages "under the working key." A message, encrypted by the client device 120 under the working key, can be received by cryptographic transaction server 110 so that the working key associated with the cryptogram can be employed to decrypt the received message. As referred to herein, a working cryptogram is generated based on a working key encrypted under a master key stored on or accessible to the cryptographic transaction server 110.

In some embodiments, the cryptographic transaction server 110 can be coupled to a plurality of hardware security modules 130 that can each be associated with a master key stored in a memory. The cryptographic transaction server 110 can employ any one of the hardware security modules 130 to offload various cryptographic operations that the hardware security module 130 is better suited to perform. In this regard, the cryptographic transaction server 110 can employ any one of the hardware security modules 130 associated with the master key to decrypt a message that is received from client device 120 and encrypted with the working cryptogram associated with the working key encrypted with the master key, or in essence, the working cryptogram associated with the master key. Similarly, if the application server 115 communicates a message to client device 120, the message can be communicated via cryptographic transaction server 110 so that any one of the hardware security modules 130 associated with the master key can employ the working key encrypted with the master key to encrypt the message for communication to the client device 120, whereby the client device 120 can employ the associated working cryptogram to decrypt the communicated message.

As will be referenced herein, a working cryptogram associated with a master key can correspond to a cryptogram that is generated based on a working key encrypted with the master key. A change of a master key to a new master key can result in the working key being encrypted with the new master key, such that a new cryptogram is generated based on the working key encrypted with the new master key. In various embodiments, the working key can be stored in a memory of any one or more of the cryptographic transaction server 110 and/or hardware security modules 130, among other computer-readable media accessible thereto.

In various embodiments, the cryptographic transaction server 110 can include, among other things, a key provisioning component 140 that can provision a different working cryptogram associated with a different master key to the client device(s) 120 while the client device(s) 120 and the application server 115 are in active communication with each other via the cryptographic transaction server 110. In other words, while a client device 120 is actively employing a first working cryptogram to encrypt messages for communication to the application server 115 via the cryptographic transaction server 110, and while the cryptographic transaction server 110 is employing a first master key associated with the first working cryptogram to decrypt the messages received from the one or more client devices 120, the cryptographic transaction server 110 can employ key provisioning component 140 to provision (e.g., provide, push, activate) a second working cryptogram (i.e., different from the first working cryptogram and associated with a second master key different from the first master key) to the one or more client devices 120, the second working cryptogram having been generated based on a working key encrypted with a second master key that replaced the first master key on a portion of the hardware security modules 130.

In some embodiments, the cryptographic transaction server 110 can employ key provisioning component 140 to generate a notification (e.g., a pop-up notification, push notification, refresh command) that includes the generated second working cryptogram. The key provisioning component 140 can further be employed to transmit the generated notification to one or more of the client device(s). The transmitted notification can cause a client device to store the second working cryptogram included in the notification received from the cryptographic transaction server 110, and begin employing the second working cryptogram to encrypt messages for communication to the application server 115 via the cryptographic transaction server 110.

In various embodiments, a client device 120 can include, among other things, a key roll-over component 150 that can store the second working cryptogram included in the notification received from the cryptographic transaction server 110, and begin employing the stored second working cryptogram to encrypt messages generated by the client device for communication to the application server 115 via the cryptographic transaction server 110. In some embodiments, the key roll-over component 150 can begin employing the stored second working cryptogram based on a detected acknowledgment of the received notification. In some other embodiments, the key roll-over component 150 can begin employing the stored second working cryptogram in response to the notification being received. In this regard, the received notification can cause the client device 120 to refresh, among other things, the working cryptogram from the first working cryptogram to the second working cryptogram included in the received notification.

Due to the high rate of transactions associated with a high frequency transaction processing environment, it is contemplated that multiple transactions can be received from a client device 120 by the cryptographic transaction server 110 within a very short period of time (e.g., milliseconds), and that some transactions can be encrypted with the first working cryptogram while some other transactions can be encrypted with the second working cryptogram, particularly soon after the second working cryptogram was provisioned on the client device 120. In other words, once the second working cryptogram is provisioned, some messages encrypted with the first working cryptogram may still be pending, or "in-flight," yet to be received and/or decrypted by the cryptographic transaction server 110. In various embodiments, the cryptographic transaction server 110, having provisioned the second working cryptogram to one or more of the client device(s), can employ the portion of the hardware security modules 130 (i.e., one or more hardware security modules on which the first master key was replaced by the second master key) to decrypt messages communicated from the client device(s) 120 and encrypted with the second working cryptogram. At the same time, the cryptographic transaction server 110 can concurrently employ a remaining portion of the hardware security modules (i.e., the hardware security modules still associated with the first master key) to decrypt messages that were communicated from the client device(s) 120 and encrypted with the first working cryptogram. In this way, maintenance (e.g., changes) of cryptographic keys on both the client device(s) 120 and the server device or associated hardware security modules 130 can be performed with no downtime or loss of communications.

Figure 2:
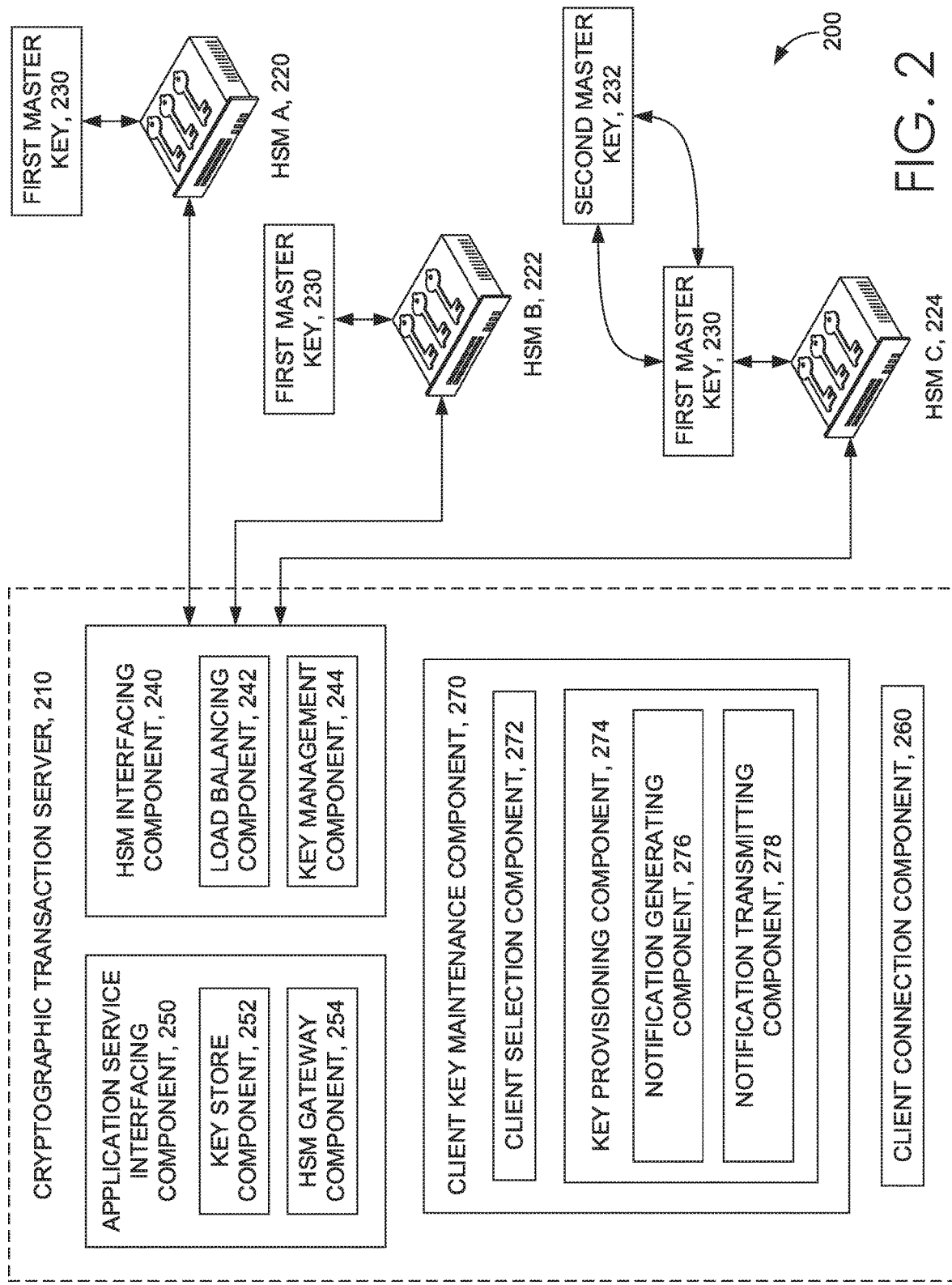
FIG. 2 is an exemplary cryptographic transaction server in accordance with some embodiments of the present invention.

Referring now to FIG. 2, a block diagram 200 is provided depicting an exemplary cryptographic transaction server 210, such as cryptographic transaction server 110 of FIG. 1, for mitigating service disruption or loss of transactions during maintenance of cryptographic keys in accordance with various embodiments described herein. As described in accordance with FIG. 1, the cryptographic transaction server 210 can be coupled to a plurality of hardware security modules 220, 222, 224 ("HSMs") that each include or are associated with a first master key 230. The first master key 230 can be stored in a memory (not shown) of the HSM 220, 222, 224 and/or a memory (not shown) of the cryptographic transaction server 210. It is contemplated that an HSM can include either a hardware or a virtual (i.e., software-based) hardware security module while remaining within the purview of the present disclosure.

In some embodiments, the cryptographic transaction server 210 can include a HSM interfacing component 240 that can communicate directly with each HSM 220, 222, 224 and/or request that operations provided thereby be performed. Among other things, the HSM interfacing component 240 can include a load balancing component 242 for balancing message traffic associated with incoming messages received from one or more client devices, such as client device(s) 120, 120n of FIG. 1, or outgoing messages to one or more client devices from an application service of an application server, such as application server 115 of FIG. 1, that is in communication with cryptographic transaction server 210. In some embodiments, the load balancing component 242 can reference a table stored in a memory of cryptographic transaction server 210, or a database (not shown) coupled to the cryptographic transaction server 210, that HSM interfacing component 240 can reference to identify each HSM 220, 222, 224 and its associated master key, encrypted working key, and/or associated working cryptogram. In this way, the load balancing component 242 can determine which HSM 220, 222, 224 can be employed to perform cryptographic operations (e.g., encryption, decryption) on messages being communicated via the cryptographic transaction server 210. By way of example, based on a second master key 232 replacing first master key 230 on HSM C 224, HSM interfacing component 240 can update the index so that a record associated with HSM C 224 can replace the first master key 230 with the second master key 232. The load balancing component 242 can send an encrypted message to HSM C 224 to be decrypted with the second master key 232 (i.e., the working key encrypted with the second master key 232). If the decryption operation fails, the load balancing component 242 can determine that based on the failed operation, one of HSMs A or B 220, 222 should be employed to perform the decryption on the encrypted message with the first master key 230 (i.e., the working key encrypted with the first master key 230).

In some further embodiments, the HSM interfacing component 240 can include a key management component 244 for performing operations associated with an HSM 220, 222, 224. By way of example, key management component 244 can read and/or write master keys from and/or to an HSM 220, 222, 224. In another example, key management component 244 can request a working cryptogram from an HSM 220, 222, 224, such that based on the request, the HSM 220, 222, 224 can retrieve the working cryptogram based on its associated master key (i.e., the working key encrypted with the associated master key). In some aspects, the key management component 244 can update, delete, or modify the index maintained by the HSM interfacing component 240 based on such operations having been performed by the HSMs 220, 222, 224. In some aspects, key management component 244 can generate and/or store unique identifiers, mnemonic identifiers, cryptograms, or other metadata associated with master keys and/or associated working cryptograms employed by the cryptographic transaction server 210. It is contemplated that any of the associated identifiers, cryptograms, or metadata can be replaced with a working cryptogram and/or master key, when referenced in various embodiments described herein, such that a corresponding working cryptogram, encrypted working key, and/or master key included in the index can be employed for performing cryptographic operations on messages being communicated via the cryptographic transaction server 210.

In some embodiments, cryptographic transaction server 210 can include an application service interfacing component 250 that can interface with (e.g., send to and/or receive messages from) an application service of an application server, such as application server 115 of FIG. 1. In this regard, all message communications being communicated from the application server or to the application server can pass through the application service interfacing component 250 to the HSM interfacing component 240. In some further embodiments, the application service interfacing component 250 can include a key store component 252 that facilitates a remote execution and/or processing of cryptographic operations for the application service. The key store component 252 can request, via the HSM interfacing component 240, that various cryptographic operations (e.g., key generation, key checking or verification, key mapping or referencing, key activation or provisioning, key rollback) be performed for the application service or for the clients, such as clients 120, 120n of FIG. 1, employing the application service. Such requests can be performed based on content and/or formatting of messages communicated from a client device or the application server hosting the application service to the cryptographic transaction server 210.

In some further embodiments, the application service interfacing component 250 can also include an HSM gateway component 254 that can, among other things, reference the index maintained by HSM interfacing component 240 to replace working cryptograms with any corresponding unique identifiers, mnemonic identifiers, cryptograms, or other metadata. In this way, in accordance with some embodiments, the actual working cryptogram does not have to be communicated to the client device(s) and instead, various references (e.g., identifiers, cryptograms, metadata) can replace the working cryptogram to comply with certain security specifications or implementation requirements. In some aspects, the HSM gateway component 254 can also reference one of a plurality of stored templates based on content or formatting of device-specific messages, or various identifiers (e.g., device IDs or hardware identifiers) included in messages communicated to or from the application service. Each template, stored in a memory of the cryptographic transaction server 210, can be referenced based on the content or formatting of a message to properly format the message for seamless interoperability with the HSM interfacing component 240, and thereby the HSMs 220, 222, 224.

In some embodiments, the cryptographic transaction server 210 can include a client connection component 260 that provides a secured connection between the cryptographic transaction server 210 and a client device, such as client device 120 of FIG. 1. In some further embodiments, the client connection component 260 can include a virtual private network server or the like, which can authenticate each client device connecting to the cryptographic transaction server 210 and, based on the authentication, provide a secured (e.g., encrypted) connection between the client device and the cryptographic transaction server 210. In this way, communicated messages, whether encrypted by the client device or not, can be secured so that devices outside of the virtual private network cannot observe the messages being communicated there between.

In some aspects, the virtual private network can route communications, sent from a client device and directed to a URI (e.g., a domain name) associated with the application service, to the application service interfacing component 250. In some embodiments, a communicated message directed to the URI and referencing a particular unique identifier, mnemonic identifier, cryptogram, or other metadata corresponding to a working cryptogram indexed by the HSM interfacing component 240 can cause the load balancing component 242 to select one of the HSMs 220, 222, 224 that corresponds to the referenced identifier, cryptogram, or other metadata to be employed for decrypting the message. In this way, an HSM 220, 222, 224 specifically designated for performing operations on messages encrypted with an associated working cryptogram can be selected and employed to decrypt such messages.

In some other embodiments, the virtual private network can route communications, sent from a client device and directed to a URI (e.g., a domain name) that is mapped by the client device to a particular resource (e.g., IP address, port) of the cryptographic transaction server 210. In this regard, the cryptographic transaction server 210 can include a first resource that is associated with a first working cryptogram, and a second resource that is associated with a second working cryptogram. In other words, HSM gateway component 254 can determine that messages received from a client via the first resource should be processed (i.e., decrypted) by an HSM (e.g., HSM 220, 222, or 224) associated with a first master key, while messages received from the client via the second resource should be processed by an HSM (e.g., HSM 220, 222, or 224) associated with a second master key. In some aspects, a server connection component (e.g., a VPN client) as will be described in FIG. 3, can include a mapping between the URI of the application service and the particular resource of the cryptographic transaction server 210, whereby a notification including a second working cryptogram and a reference to the second resource being communicated to the client device can cause the client device to modify the mapped URI, such that messages encrypted with the second working cryptogram, though still directed to the URI of the application service, can be routed to the second resource and thus be decrypted with one or more corresponding HSMs (e.g., HSM 220, 222, or 224).

In various embodiments, the cryptographic transaction server 210 can include a client key maintenance component 270 for provisioning new working cryptograms to one or more client devices, such as client devices 120, 120n of FIG. 1, while any one or more of the client device(s) is communicating messages encrypted with a prior working cryptogram to the cryptographic transaction server 210. In some embodiments, the client key maintenance component 270 can include a client selection component 272 that selects one or more client devices, such as client devices 120, 120n of FIG. 1, to be provisioned with a new working cryptogram generated from a working key encrypted with a new master key replacing a prior master key on a portion of the HSMs 220, 222, 224. Client devices can be selected in a variety of manners, including selecting a defined number of client devices periodically (e.g., per a defined duration), progressively (e.g., starting with one and increasing over time), manually (e.g., based on user selection), or based on detected communication activity (e.g., rate of messages being communicated), by way of example.

For each selected client device, the client key maintenance component 270 employs a key provisioning component 274 having a notification generating component 276 and a notification transmitting component 278. In some embodiments, the notification generating component 276 of key provisioning component 274 can generate a notification that includes a new working cryptogram that was generated based on a working key encrypted with a new master key replacing a prior master key on a portion of the HSMs 220, 222, 224. The notification transmitting component 278 can transmit the generated notification, among other things, to the selected client device to provision the new working cryptogram. The transmitted notification can cause the selected client device to employ the new working cryptogram, for encrypting messages communicated to the cryptographic transaction server 210. Based on the transmitted notification being received by the client device, the notification can cause the new working cryptogram to be provisioned and employed by the client device in a variety of manners, as will be described now with reference to FIG. 3.

Figure 3:
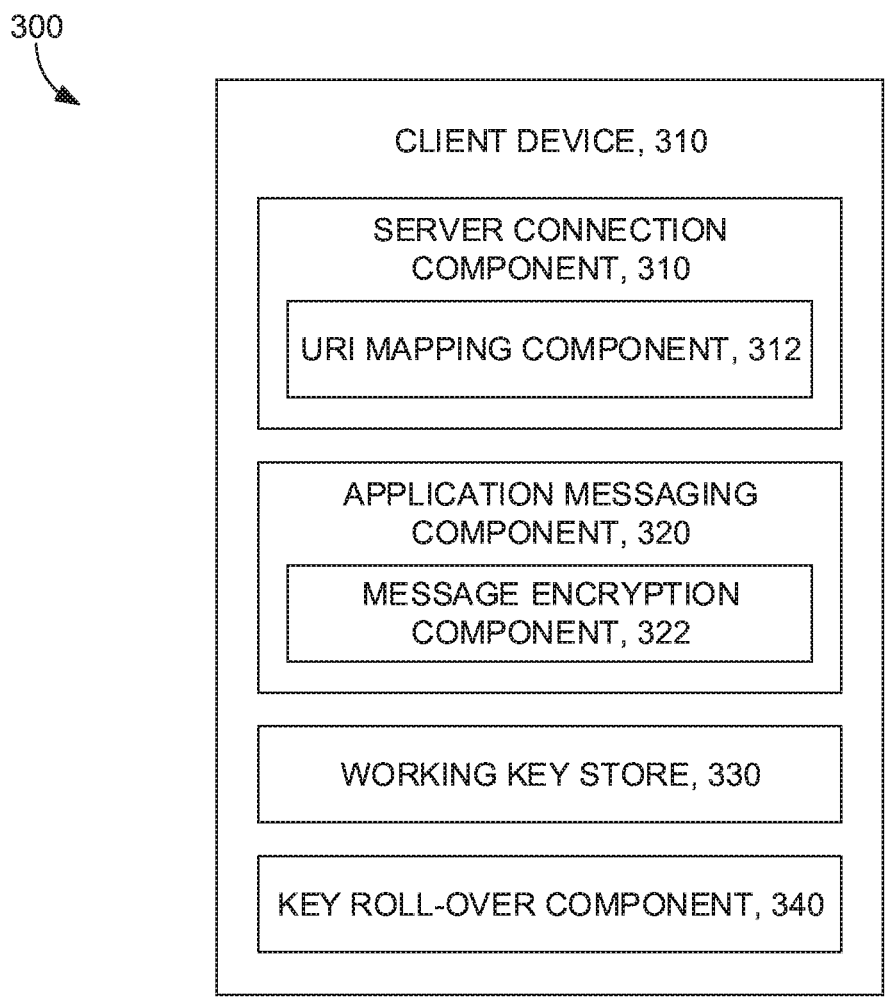
FIG. 3 is a client device in accordance with some embodiments of the present invention.

Referring now to FIG. 3, a block diagram 300 is provided depicting an exemplary client device 310 in accordance with various embodiments described herein. The client device 310 can be a client device, such as client device 120 of FIG. 1, that generates messages for communication to an application service, such as one hosted by application server 115 of FIG. 1. The messages being generated and sent from the client device 310, to the application service, can be routed through a cryptographic transaction server, such as cryptographic transaction server 110, 210 of FIGS. 1 & 2, respectively. In some embodiments, the client device 310 can encrypt each generated message prior to sending the message with a working cryptogram that is provisioned on the client device 310 by the cryptographic transaction server. In some other embodiments, the client device 310 can be connected to the cryptographic transaction server via a secured connection (e.g., a VPN connection) such that the generated messages can be encrypted and/or decrypted by the cryptographic transaction server 210 for subsequent communication (e.g., routing) to the application service of the application server. It is contemplated that various steps of the encryption/decryption process can be performed by the client device 310 and/or the cryptographic transaction server 210 in accordance with various embodiments described herein.

The client device 310 can include a server connection component 310 that can initiate and establish a secured connection to the cryptographic transaction server. In some embodiments, the server connection component 310 can include a VPN client application that initiates and establishes the secured connection. In some aspects, the server connection component 310 can direct messages generated by the client device 310 to a URI (e.g., a domain name, subdomain) associated with the application service. In some embodiments, the URI can be mapped to a resource identifier (e.g., an IP address, port) of the cryptographic transaction server by a URI mapping component 312 of the server connection component 310, such that messages communicated from the client device and intended for the application service can be processed (e.g., encrypted or decrypted) by the cryptographic transaction server. The URI mapping component 312 can map the URI to a resource identifier of the cryptographic transaction server utilizing, by way of example, a host file stored on the client device 310.

The client device 310 can also include an application messaging component 320 that generates messages for communication to the application service of the application server. The application messaging component 320 can include, by way of non-limiting example, a payment processing client application installed on a point-of-sale device, or installed on a payment processing server coupled to a plurality of point-of-sale devices. The application messaging component 320 can include a message encryption component 322 that can employ a provisioned working cryptogram to encrypt each message generated by the application messaging component 320. The message encryption component 322 can employ the provisioned working cryptogram stored in a working key store 330 of the client device 310, which can include a file or database stored in a memory of the client device 310. In some aspects, the working key store 330 can include only the provisioned working cryptogram, such that only one working cryptogram is stored on and employed by the client device 310. In some other aspects, the working key store 330 can include a stored plurality of provisioned working cryptograms, such that a most-recently provisioned working cryptogram is flagged as the provisioned working cryptogram to be employed for performing cryptographic operations on the client device 310, while a previously-provisioned working cryptogram is flagged as an inactive working cryptogram that may be employed as a fallback working cryptogram to be employed for performing cryptographic operations on the client device 310 based on a determined failure of one or more cryptographic operations associated with the most-recently provisioned working cryptogram by the client device 310 or the cryptographic transaction server.

In various embodiments, the client device 310 can include a key roll-over component 340 that can, among other things, detect a receipt of a notification that was generated by and communicated to the client device 310 from the cryptographic transaction server. In some embodiments, the received notification can include a new working cryptogram that is generated based on a working key encrypted with a new master key (e.g., second master key 232 of FIG. 2) that replaced a prior master key (e.g., first master key 230 of FIG. 2) on a portion of HSMs being employed by the cryptographic transaction server, such as HSM C 224 of HSMs 220, 222, 224 of FIG. 2. The key roll-over component 340 can, based on a detected receipt of the notification including the new working cryptogram, store the included new working cryptogram into the working key store 330. The key roll-over component 340 can replace a previously-provisioned working cryptogram, or define the new working cryptogram as the most-recently provisioned working cryptogram while defining the stored working cryptogram currently being employed by the message encryption component 322 as a fallback working cryptogram, by way of example.

In some other embodiments, the received notification can include the new working cryptogram generated based on the working key encrypted with the new master key (e.g., second master key 232 of FIG. 2) that replaced the prior master key (e.g., first master key 230 of FIG. 2) on the portion of the HSMs being employed by the cryptographic transaction server, such as HSM C 224 of HSMs 220, 222, 224 of FIG. 2, in addition to a new resource identifier associated with the cryptographic transaction server. The key roll-over component 340 can, based on a detected receipt of the notification including the new working cryptogram and the new resource identifier, and store the included new working cryptogram into the working key store 330, as described in the previously-described embodiment. The key roll-over component 340 can also employ the URI mapping component 312 to modify the URI, mapped to a current resource identifier associated with the cryptographic transaction server, to map the URI to the new resource identifier included in the received notification. The URI mapping component 312 can modify the mapped URI by editing a stored host file to include the new resource identifier, by way of example. In this way, messages generated by the application messaging component 320 can be encrypted with the newly-provisioned working cryptogram—and while the encrypted messages continue to be directed to the URI associated with the application service, the URI can direct the encrypted messages to be communicated to the new resource identifier defined in the modified URI. As described in accordance with some embodiments of the application service interfacing component 250 of FIG. 2, the cryptographic transaction server 210 can determine the resource identifier through which a message was received from a client device. Based on the determination, the cryptographic transaction server 210 can direct the message to a corresponding one of the HSMs 220, 222, 224 via the HSM interfacing component 240 of FIG. 2.

It is contemplated that the foregoing embodiments can be performed while the client device 310 is generating messages, encrypting the messages, and communicating the encrypted messages to the cryptographic transaction server via the URI associated with the application service. In this way, a roll-over or provisioning (e.g., change, activation) of a working cryptogram for performing cryptographic operations on messages by the client device can be performed in real-time, without disruption in message generation, encryption, or the like.

Figure 4:
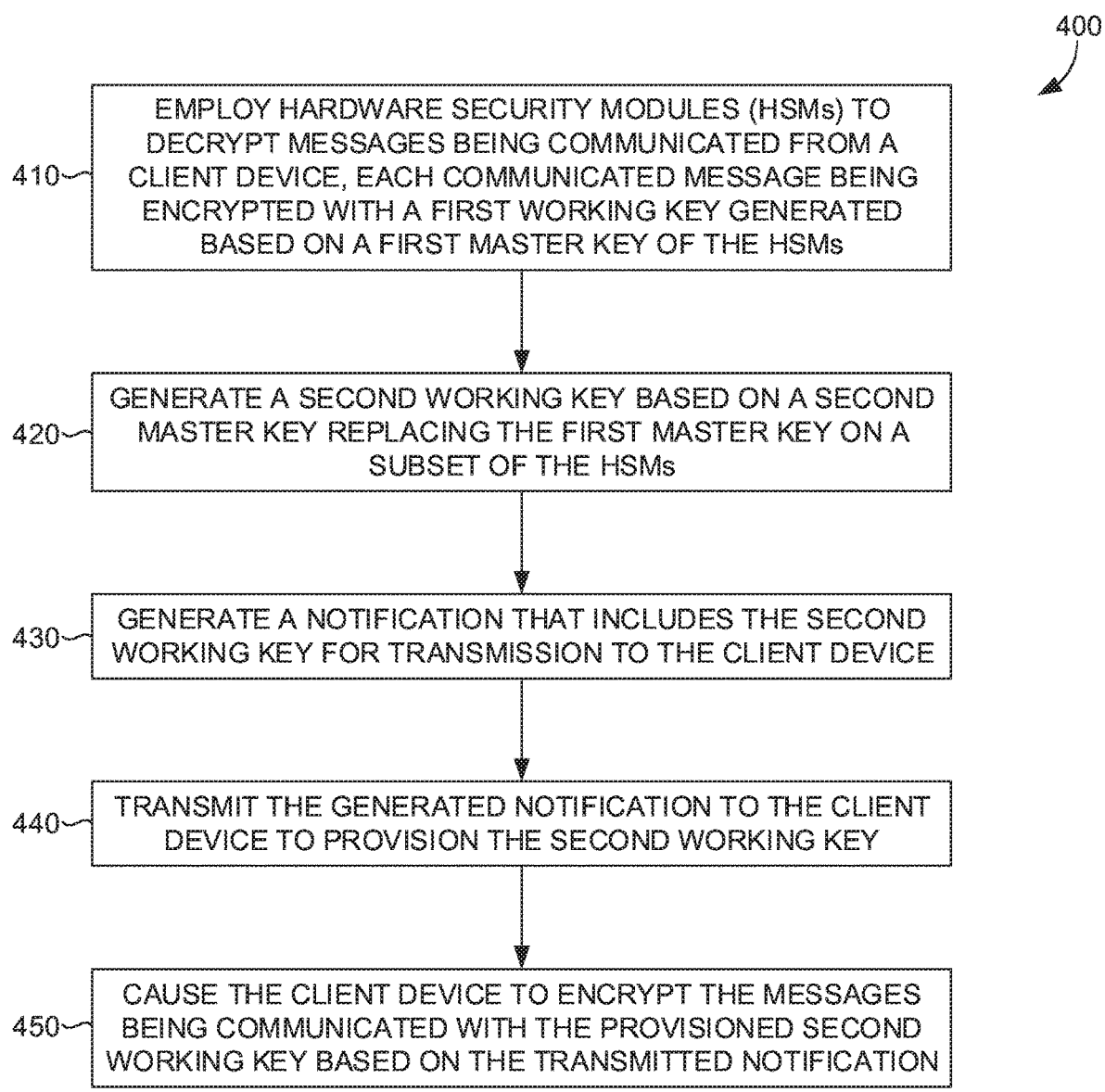
FIG. 4 is a flow diagram showing a method for changing cryptographic keys in high-frequency transaction environments in accordance with some embodiments of the present invention.

Turning now to FIG. 4, a flow diagram is provided that illustrates a computer-implemented method for changing cryptographic keys in high-frequency transaction environments. As described in accordance with various embodiments of the present disclosure, a high-frequency transaction environment can include a server device, such as cryptographic transaction server 110, 210 of FIGS. 1 & 2, respectively, and a client device, such as client device 120, 310 of FIGS. 1 & 3, respectively. The client device can generate messages to be interpreted by an application service of an application server, such as application server 115 of FIG. 1. The client device can encrypt the messages with a provisioned working cryptogram stored in a memory of the client device, and communicate the messages to a URI that directs the encrypted messages to the cryptographic transaction server to be processed (e.g., decrypted) for passage to and interpretation by the application service. As also described, the server device can be coupled to and/or employ a plurality of hardware security modules ("HSMs") to perform various cryptographic operations (e.g., encryption, decryption) on messages passed thereto by the cryptographic transaction server.

At step 410, the server device can employ the HSMs to decrypt message that are being communicated to the server device from the client device. Each of the message that are being communicated from the client device are encrypted by the client device with a first working cryptogram provisioned on the client device. The first working cryptogram is a working cryptogram that was generated by the server device and/or the HSM(s) based on a working key encrypted with a first master key associated with the HSMs.

At step 420, the server device can generate or cause the generation of a second working cryptogram based on a working key being encrypted with a second master key that is newly-associated with a subset of the HSMs. That is, the second master key replaced the first master key on some of the HSMs, and the server device can generate, or cause the subset of the HSMs to generate, the second working cryptogram based on the newly-associated second master key.

At step 430, the server device can generate a notification that includes, among other things, the generated second working cryptogram for transmission to the client device. In some aspects, the generated notification can also include a resource identifier (e.g., IP address, port) for updating a host file or a URI mapping that the client device can employ to communicate with the server device, as described in accordance with various embodiments of client device 310 of FIG. 3.

At step 440, the server device can transmit the generated notification to the client device to provision the second working cryptogram on the client device. The transmitted notification can, at step 450, cause the client device to store the included second working cryptogram and encrypt the messages being communicated to the server device with the stored second working cryptogram, the second working cryptogram having been provisioned on the client device based on the client device having received the transmitted notification. In some aspects, if the generated notification includes the resource identifier for updating the host file or the URI mapping, the client device can update the host file or URI mapping to direct the messages to the updated resource identifier of the server device.

As is described in accordance with various embodiments of the present disclosure, steps 420, 430, 440, 450 can be performed by the server device while step 410 is being performed. That is, while the client device is communicating messages, encrypted with the provisioned first working cryptogram, to the server device, the server device can generate or cause generation of the second working cryptogram, generate the notification including the second working cryptogram, transmit the generated notification to the client device to provision the second working cryptogram, and cause the client device to begin encrypting the messages with the second working cryptogram that is provisioned based on the transmitted notification being received by the client device.

In some aspects, the second working cryptogram can be provisioned on the client device based on an acknowledgement of receipt by the client device. In some further aspects, the host file or URI mapping can also be modified or updated on the client device based on the acknowledgement. The acknowledgement of receipt can be based on a detected user input (e.g., an input corresponding to a GUI prompt displayed by the client device to accept the second working cryptogram and/or URI update), an automatic refresh of a client device connection to the server device (e.g., a remap of the URI as described in accordance with URI mapping component 312 of FIG. 3), or a combination thereof, among other things. The server device can employ the subset of the HSMs to decrypt messages communicated from the client device and encrypted with the second working cryptogram, and concurrently employ a remaining subset of the HSMs associated with the first master key to decrypt messages communicated from the client device and encrypted with the first working cryptogram. It is contemplated that any messages encrypted with the first working cryptogram received by the server device are "in-flight" messages that were communicated from the client device prior to the provisioning of the second working cryptogram.

Figure 5:
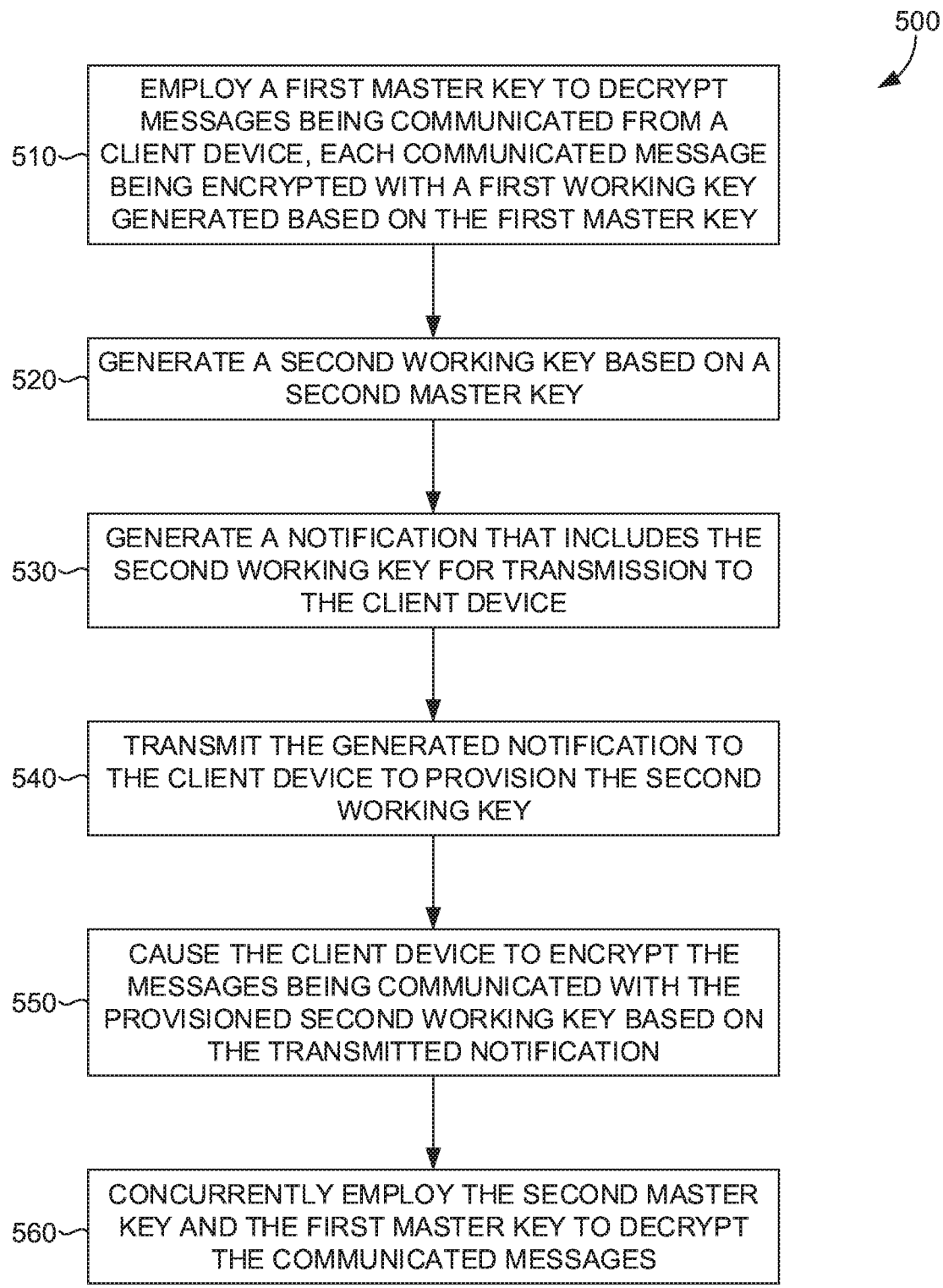
FIG. 5 is a flow diagram showing a method for changing cryptographic keys in high-frequency transaction environments in accordance with some embodiments of the present invention.

Referring now to FIG. 5, a flow diagram is provided that illustrates another method for changing cryptographic keys in high-frequency transaction environments. As described in accordance with various embodiments of the present disclosure, a high-frequency transaction environment can include a server device, such as cryptographic transaction server 110, 210 of FIGS. 1 & 2, respectively, and a client device, such as client device 120, 310 of FIGS. 1 & 3, respectively. The client device can generate messages to be interpreted by an application service of an application server, such as application server 115 of FIG. 1. The client device can encrypt the messages with a provisioned working cryptogram stored in a memory of the client device, and communicate the messages to a URI that directs the encrypted messages to the cryptographic transaction server to be processed (e.g., decrypted) for passage to and interpretation by the application service. The server device can employ a master key stored in a memory and associated with the provisioned working cryptogram, to perform various cryptographic operations (e.g., encryption, decryption) on messages passed thereto by the cryptographic transaction server.

At step 510, the server device can employ a first master key to decrypt messages that are being communicated to the server device from the client device. Each of the messages that are being communicated from the client device are encrypted by the client device with a first working cryptogram provisioned on the client device. The first working cryptogram is a working cryptogram that was generated by the server device based on a working key encrypted with a first master key stored in the memory of the server device.

At step 520, the server device can generate a second working cryptogram based on a new, second master key stored in the memory with the first master key. That is, the second master key and the first master key are stored in the memory, and the server device can generate the second working cryptogram based on the working key encrypted with the new, second master key.

At step 530, the server device can generate a notification that includes, among other things, the generated second working cryptogram for transmission to the client device. In some aspects, the generated notification can also include a resource identifier (e.g., IP address, port) for updating a host file or a URI mapping that the client device employs to communicate with the server device, as described in accordance with various embodiments of client device 310 of FIG. 3.

At step 540, the server device can transmit the generated notification, to the client device, to provision the second working cryptogram on the client device. The transmitted notification can, at step 550, cause the client device to store the included second working cryptogram and encrypt the messages being communicated to the server device with the stored second working cryptogram, provisioned on the client device based on the client device having received the transmitted notification. In some aspects, if the generated notification includes the resource identifier for updating the host file or the URI mapping, the client device can update the host file or URI mapping to direct the messages to the resource identifier of the server device included in the notification.

At step 560, the server device can concurrently employ the first and the second stored master keys, or two instances of the working key that are each encrypted with one of the first and second stored master keys, to decrypt the messages communicated from the client device, which may be encrypted with the provisioned second working cryptogram or the previously-provisioned first working cryptogram. It is contemplated that any messages encrypted with the previously-provisioned first working cryptogram communicated to and received by the server device are "in-flight" messages that were communicated from the client device prior to the provisioning of the second working cryptogram. In some aspects, after transmitting the notification to the client device, the server device can employ the second master key, or the working key encrypted with the second master key, to decrypt each message communicated from the client device and received by the server device. If the server device determines that the decryption operation fails, the server device can alternatively employ (e.g., fallback to) the first master key, or the working key encrypted with the first master key, to decrypt the message. In some other aspects, if the generated notification includes the resource identifier of the server device for modifying the URI to which the client device is directing the messages, the server device can determine which master key, or encrypted working key, should be employed to decrypt the message based on which resource identifier the message was received through. In some further aspects, the server device can still alternatively employ the first or the second master key, or the working key encrypted by one of the first and second master keys, if a decryption operation fails with the other master key or other encrypted working key.

As is described in accordance with various embodiments of the present disclosure, steps 520, 530, 540, and 550 can be performed by the server device while step 510 is being performed. That is, while the client device is communicating messages, encrypted with the provisioned first working cryptogram, to the server device, the server device can generate the second working cryptogram, generate the notification including the second working cryptogram and a resource identifier if applicable, transmit the generated notification to the client device to provision the second working cryptogram and update the URI mapping, if applicable, causing the client device to begin encrypting the messages with the second working cryptogram provisioned based on the transmitted notification being received by the client device. If applicable, the client device can continue communicating the messages encrypted with the second working cryptogram to the URI associated with the application service. The underlying URI mapping, however, will direct the messages to the updated resource identifier of the server device, such that the server device can determine which master key or encrypted working key should be employed to decrypt the communicated message.

In some aspects, the second working cryptogram can be provisioned on the client device based on an acknowledgement of receipt by the client device. In some further aspects, the host file or URI mapping can also be modified or updated on the client device based on the acknowledgement. The acknowledgement of receipt can be based on a detected user input (e.g., an input corresponding to a GUI prompt displayed by the client device to accept the second working cryptogram and/or URI update), an automatic refresh of a client device connection to the server device (e.g., a remap of the URI as described in accordance with URI mapping component 312 of FIG. 3), or a combination thereof, among other things. The server device can employ the second master key, or working key encrypted therewith, to decrypt messages communicated from the client device and encrypted with the second working cryptogram, and concurrently employ the first master key, or working key encrypted therewith, to decrypt messages communicated from the client device and encrypted with the first working cryptogram.

Figure 6:
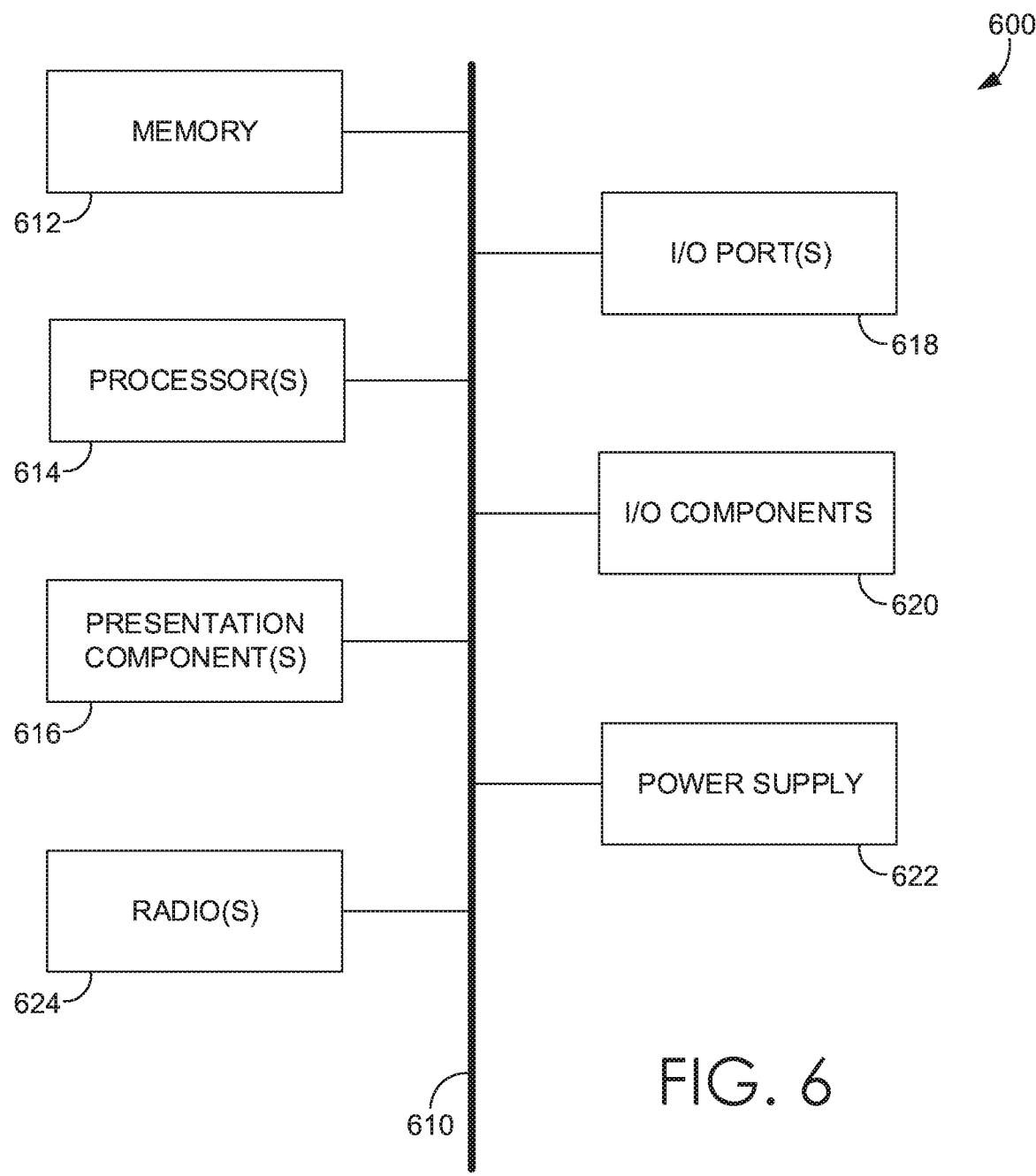
FIG. 6 is a block diagram of an exemplary computing environment suitable for use in implementing some embodiments of the present invention.

Having described embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention provide for, among other things, techniques for changing cryptographic keys on computing devices in high-frequency transaction environments while mitigating service disruption or loss of transactions during the change. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for changing cryptographic keys in high-frequency transaction environments, the method comprising:
    employing, by a server device, hardware security modules (HSMs) coupled to the server device to decrypt messages being communicated from a client device, wherein the messages being communicated are encrypted with a first working cryptogram generated based on a first master key of the HSMs;
    generating, by the server device, a notification that includes a second working cryptogram for transmission to the client device, wherein the second working cryptogram is generated based on a second master key replacing the first master key on a subset of the HSMs; and
    causing, by the server device, the messages being communicated from the client device to be encrypted with the included second working cryptogram based on the transmitted notification, the subset of the HSMs being employed to decrypt the communicated messages encrypted with the included second working cryptogram while a remaining subset of the HSMs is employed to decrypt the communicated messages encrypted with the first working cryptogram, wherein the subset of the HSMs comprises at least one HSM and the remaining subset of the HSMs comprises at least one different HSM, the subset of the HSMs and the remaining subset of the HSMs being concurrently employed, and wherein the remaining subset of the HSMs is employed to decrypt at least one message communicated before the messages were caused to be encrypted with the second working cryptogram.

2. The computer-implemented method of claim 1, wherein the employing, generating, and causing is performed while the messages encrypted with the first working cryptogram are being communicated.

3. The computer-implemented method of claim 1, wherein each one of the messages is received by the server device for further communication to an application service provided by the server device.

4. The computer-implemented method of claim 1, wherein the messages are being communicated to a URI that is mapped to a first address of the server device for receiving the communicated messages encrypted with the first working cryptogram, and
wherein the mapped URI is modified based on the transmitted notification, the modified URI being mapped to a second address of the server device for receiving the communicated messages encrypted with the second working cryptogram.

5. The computer-implemented method of claim 4, wherein the subset of the HSMs is selected for employment based on a communicated message being received via the first address, and the remaining subset of the HSMs is selected for employment based on the communicated message being received via the second address.

6. The computer-implemented method of claim 4, wherein the mapped URI is modified by the client device based on a detected acknowledgement of the communicated notification.

7. The computer-implemented method of claim 1, wherein the first working cryptogram is provisioned on the client device, and the second working cryptogram is provisioned on the client device based at least in part on the transmitted notification, the computer-implemented method further comprising:
    de-provisioning, by the server device, the provisioned first working cryptogram based on a determined inactivity associated with the remaining subset of the HSMs.

8. A non-transitory computer storage medium storing computer-useable instructions that, when used by one or more computing devices, cause the one or more computing devices to perform operations comprising:
    employing a working key encrypted with a first master key stored on hardware security modules (HSMs) to decrypt messages being communicated from a client device, wherein the messages being communicated are each encrypted with a first working cryptogram generated based on the working key being encrypted with the first master key;
    generating a notification that includes a second working cryptogram, wherein the second working cryptogram was generated based on the working key being encrypted with a second master key, the second master key replacing the first master key on a first subset of the HSMs;
    causing the messages being communicated to each to be encrypted with the included second working cryptogram based on a transmission of the generated notification to the client device; and
    concurrently employing the working key encrypted with the second master key on the first subset of the HSMs and the working key encrypted with the first master key stored on a remaining subset of the HSMs to decrypt the communicated messages, wherein the first subset of the HSMs comprises at least one HSM and the remaining subset of the HSMs comprises at least one different HSM.

9. The non-transitory computer storage medium of claim 8, wherein the working key encrypted with the first master key is employed to decrypt a communicated message based on a determination that the working key encrypted with the second master key fails to decrypt the message.

10. The non-transitory computer storage medium of claim 8, wherein a communicated message is encrypted with the first working cryptogram based on the first working cryptogram being provisioned on the client device, and wherein the second working cryptogram is provisioned on the client device based at least in part on the transmission of the generated notification.

11. The non-transitory computer storage medium of claim 10, wherein the second working cryptogram is provisioned on the client device based further in part on an acknowledgement of the transmitted notification by the client device.

12. The non-transitory computer storage medium of claim 10, the operations further comprising:
de-provisioning the first working cryptogram based at least in part on a determined inactivity associated with the first master key.

13. The non-transitory computer storage medium of claim 12, wherein the first working cryptogram is de-provisioned based further in part on the first master key being replaced with the second master key.

14. The non-transitory computer storage medium of claim 8, wherein the messages being communicated from the client device are directed to a URI mapped to a first address for receiving the communicated messages encrypted with the first working cryptogram, and the mapped URI is remapped to a second address for receiving the communicated messages encrypted with the second working cryptogram based at least in part on the transmission of the generated notification, wherein the working key encrypted with one of the second master key and the first master key is selected to be employed based on the communicated messages being received via one of the first and the second addresses.

15. A computerized system comprising:
one or more processors; and
one or more computer storage media storing computer-usable instructions that, when used by the one or more processors, cause the one or more processors to:
employ hardware security modules (HSMs) to decrypt messages being communicated from a client device, wherein the messages being communicated are encrypted with a first working cryptogram generated based on a first master key of the HSMs;
generate a notification that includes a second working cryptogram, the second working cryptogram being generated based on a second master key that replaced the first master key on a first subset of the HSMs, wherein a transmission of the generated notification to the client device causes the client device to encrypt the messages being communicated with the included second working cryptogram; and
based at least in part on the transmission of the generated notification, employing the first subset of the HSMs to decrypt a communicated message encrypted with the second working cryptogram while a remaining subset of the HSMs is employed to decrypt another communicated message encrypted with the first working cryptogram, the another communicated message encrypted with the first working cryptogram being communicated before the client device was caused to encrypt the messages with the second working cryptogram, wherein the first subset of the HSMs comprises at least one HSM and the remaining subset of the HSMs comprises at least one different HSM, the first subset of the HSMs and the remaining subset of the HSMs being concurrently employed.

16. The system of claim 15, wherein the transmission of the generated notification to the client device causes the client device to encrypt the messages being communicated with the included second working cryptogram while previously-provisioned messages from the client device are inflight and are encrypted with the first working cryptogram.

17. The system of claim 15, wherein the transmission of the generated notification to the client device causes the client device to encrypt the messages being communicated with the included second working cryptogram instead of the first working cryptogram.

18. The system of claim 15, wherein the first cryptogram is generated based on a working key encrypted with the first master key, and the second cryptogram is generated based on the working key encrypted with the second master key.

* * * * *